(12) United States Patent
Gutiérrez Muñiz et al.

(10) Patent No.: US 11,939,271 B2
(45) Date of Patent: Mar. 26, 2024

(54) WARM MIX ASPHALT COMPOSITIONS AS PAVEMENT SURFACE TREATMENT

(71) Applicant: Quimikao, S.A. de C.V., El Salto (MX)

(72) Inventors: Álvaro Gutiérrez Muñiz, El Salto (MX); Raúl Terán Orozco, El Salto (MX); Luis Enrique Ramirez Soto, El Salto (MX); Luis Felipe Ortiz Cardenas, El Salto (MX)

(73) Assignee: QUIMIKAO, S.A. DE C.V., El Salto (MX)

( * ) Notice: Subject to any disclaimer, the term of this patent is extended or adjusted under 35 U.S.C. 154(b) by 1198 days.

(21) Appl. No.: 16/604,512

(22) PCT Filed: Apr. 12, 2017

(86) PCT No.: PCT/IB2017/052102
§ 371 (c)(1),
(2) Date: Oct. 10, 2019

(87) PCT Pub. No.: WO2018/189570
PCT Pub. Date: Oct. 18, 2018

(65) Prior Publication Data
US 2023/0140457 A1    May 4, 2023

(51) Int. Cl.
*E01C 7/26* (2006.01)
*C04B 18/167* (2023.01)
(Continued)

(52) U.S. Cl.
CPC ........ *C04B 40/0039* (2013.01); *C04B 18/167* (2013.01); *C04B 24/003* (2013.01);
(Continued)

(58) Field of Classification Search
CPC ........ E01C 7/26; E01C 19/002; E01C 19/025; C04B 18/167; C04B 24/003; C04B 24/08;
(Continued)

(56) References Cited

U.S. PATENT DOCUMENTS 7,393,907 B2 * 7/2008 Imuta .................... C08F 210/00
526/348
8,894,321 B2 * 11/2014 Jack ........................ E01C 21/00
404/72

(Continued)

FOREIGN PATENT DOCUMENTS

| CN | 104559266 A | 4/2015 | |
| EP | 0 926 191 A2 | 6/1999 | |
| RU | 2650922 C2 * | 8/2014 | ............. C09C 1/021 |

*Primary Examiner* — Raymond W Addie
(74) *Attorney, Agent, or Firm* — SEED INTELLECTUAL PROPERTY LAW GROUP LLP

(57) ABSTRACT

Disclosed herein is a warm mix asphalt additive comprising (a) a wax; (b) a phosphoric ester; and (c) a fatty amine. Preferably component (a) is a fatty amide wax and component (b) is a C16-C18 alkyl phosphoric ester. Also disclosed is a warm mix asphalt binder composition comprising asphalt and a warm mix asphalt additive, and methods for its preparation thereof. Additionally disclosed is a warm mix asphalt composition comprising a warm mix asphalt binder and aggregate, and methods for its preparation thereof.

16 Claims, 6 Drawing Sheets

(51) Int. Cl.
*C04B 24/00* (2006.01)
*C04B 24/08* (2006.01)
*C04B 24/12* (2006.01)
*C04B 26/26* (2006.01)
*C04B 40/00* (2006.01)
*E01C 19/00* (2006.01)
*C04B 111/00* (2006.01)
*E01C 19/02* (2006.01)

(52) U.S. Cl.
CPC ............ *C04B 24/08* (2013.01); *C04B 24/121* (2013.01); *C04B 26/26* (2013.01); *E01C 7/26* (2013.01); *E01C 19/002* (2013.01); *C04B 2111/0075* (2013.01); *E01C 19/025* (2013.01)

(58) Field of Classification Search
CPC ... C04B 24/121; C04B 26/26; C04B 40/0039; C04B 111/0075
USPC .......................................... 404/17–33, 72–75
See application file for complete search history.

(56) References Cited

U.S. PATENT DOCUMENTS

| | | | |
|---|---|---|---|
| 9,487,641 B2 | 11/2016 | Gutierrez Muniz et al. | |
| 2003/0091389 A1* | 5/2003 | Zentner ................ | E01C 11/005 404/17 |
| 2013/0239850 A1 | 9/2013 | Naidoo et al. | |
| 2014/0199122 A1 | 7/2014 | Reinke et al. | |
| 2014/0366774 A1 | 12/2014 | Barreto et al. | |
| 2016/0002442 A1* | 1/2016 | Rowland ............... | C08L 95/005 106/270 |

* cited by examiner ns Index" according to European Standard NLT-330). These compositions comprise a warm mix asphalt additive that is incorporated into asphalt prior to mixing with any stone material or compound. The warm mix asphalt additives of the present disclosure are especially designed to modify the rheological properties of asphalt so that it has reduced viscosity, decreased fragility, and reduced aging and adhesion problems. The present warm mix asphalt compositions are resistant to permanent deformation, to cracking caused by fatigue or temperature, to oxidation and to damage caused by humidity.

WARM MIX ASPHALT COMPOSITIONS AS PAVEMENT SURFACE TREATMENT

FIELD OF THE INVENTION

The present invention relates to warm mix asphalt compositions being used as a pavement surface treatment to be applied on an already existing surface or base course pavement to prolong its service life, correct rutting problems, increase roughness (increase the friction coefficient) and increase regularity (decrease the IRI "International Roughness Index" according to European Standard NLT-330). These compositions comprise a warm mix asphalt additive that is incorporated into asphalt prior to mixing with any stone material or compound. The warm mix asphalt additives of the present disclosure are especially designed to modify the rheological properties of asphalt so that it has reduced viscosity, decreased fragility, and reduced aging and adhesion problems. The present warm mix asphalt compositions are resistant to permanent deformation, to cracking caused by fatigue or temperature, to oxidation and to damage caused by humidity.

STATE OF THE ART

Surface course or base course roadway paving is based on the application of a layer of asphalt mixture that comprises asphalt, i.e. bituminous products obtained from petroleum, and different types of stone materials (aggregates), such as coarse aggregate, for example, crushed stone material, and fine aggregate such as sand and filler (dust), or other inorganic fillers. A typical asphalt paving mixture composition contains about 54% of coarse aggregate, about 35% of fine aggregate, about 5% of filler, and approximately 6% of asphalt (bitumen), which acts as a binding agent.

Most often, paving, when considering the quantity of bitumen consumed worldwide, applies so-called hot mix asphalt technologies. These technologies are characterized by mixing the bituminous products with the aggregates at high temperatures, of between 130 and 180° C., followed by laying and compaction processes, also carried out under hot conditions.

The so-called warm mix asphalt technologies have been developed in order to reduce paving temperatures, i.e., the temperatures used in the preparation and application of asphalt mixtures. The basis for these technologies consists of reducing the viscosity of asphalt in order to facilitate the mixing thereof with aggregate, such that compaction of the mixture is effective at temperatures between 20 and 55° C. lower than those used in traditional methods. The most obvious advantage of reducing roadway paving temperature is saving energy. Another clear benefit of these techniques is that they facilitate paving in places where heating equipment is not available in situ. In such places, the cooling that may take place during transport of the asphalt would lead to problems when conventional asphalt mixtures are used. On the other hand, warm mix asphalt techniques allow for a considerable reduction in the emission of toxic smokes, such as carbon monoxide, and nitrous and sulfurous oxides.

Warm mix asphalt technologies basically require the presence of additives that reduce the viscosity of the bituminous compounds. However, such additives are considered to be completely effective if they also have an effect on the rest of the technical issues that asphalt additives must resolve in relation to the application and the durability of asphalt. A suitable additive for the preparation of warm asphalt mixtures should provide a solution to the following technical problems:

a) asphalt at temperatures between 100 and 160° C. exhibits high viscosities, which makes handling difficult;
b) asphalt at temperatures between 58 and 82° C. has the consistency of a viscous liquid, which also makes handling difficult;
c) asphalt at low temperatures may become too fragile;
d) asphalt reacts with oxygen in the atmosphere, which causes it to age;
e) a high interfacial tension is generated between asphalt and aggregates, which causes adhesion problems.

Warm mix asphalt technologies traditionally used in surface or a base course paving can be used in surface treatment paving. When used in surface treatment paving, the problems associated with warm mix asphalt technologies that need to be overcome, are the same, and therefore, the warm mix asphalt compositions require additives that are able to reduce asphalt viscosity, decrease asphalt fragility, and additionally reduce the aging and adhesion problems common to asphalt.

Technologies that are currently commonly used for surface treatment paving are micro-surfacing and slurry seal, but their application is limited because of the drawbacks associated with the emulsions they employ. These emulsions (generally cationic ones) are used to cover the aggregate. The emulsions are then broken up and the water they contain is eliminated. Such asphalt compositions present maximum adhesion and consistency. Nevertheless, the use of emulsions causes the following disadvantages:

1. Only limited types of aggregates can be used, as aggregates having high electric charge cannot be easily covered with the emulsion.
2. The traffic opening time, defined as the time between laying the asphalt mixture to the time when the paved road is opened for traffic flow, is at least one hour, depending on weather conditions, and overnight application. This is especially true when the ambient temperature is below 20° C., as water evaporates slowly resulting in an increase in traffic opening time of up to 4 hours.
3. The asphalt used can only be modified in a very limited way in view of the fact that if its softening point is increased, it cannot be emulsified.
4. Recycling of generated asphalt emulsions is practically impossible.
5. Technically trained staff are required to apply the paving (especially when working with micro-surfacing).

In order to resolve the above-mentioned technical problems associated with the application of warm mix asphalt as a surface or a base course pavement, or a pavement surface treatment, a large variety of asphalt compositions have been developed.

U.S. Pat. No. 8,722,771 B2 discloses sulphur modified asphalt concrete mixtures for use in warm mix asphalt applications, which may be used to provide superficial coats (road surfacing). Such asphalt concrete mixtures have a reduced total raw material cost and at the same time provide equivalent or improved performance when compared with traditional asphalt compositions. The asphalt concrete mixtures comprise binder compositions and aggregates, wherein the binder compositions comprise a polyphosphoric acid, a macromolecular polymer having a saturated backbone with macromolecular modifications, sulfur, non-surfactant additives based on wax chemistry, and bitumen. The polyphosphoric acid can be present in an amount effective to provide increased stiffness at lower mixing temperatures. The macromolecular polymer can be present in an amount effective in increasing the viscosity of the composition so that it can be used in warm mix applications. The sulfur can be present in an amount effective to at least partially emulsify the composition. The non-surfactant additives based on wax chemistry can be present in an amount effective to provide a lubricating effect on the composition.

U.S. Pat. No. 9,394,652 B2 discloses functionally dry (of reduced water content) warm mix asphalt binder compositions, polymer modified asphalt binder compositions and polymer/acid-modified asphalt binder compositions that have been modified with lubricating non-aqueous surfactants, non-surfactant additives or acids or combinations thereof (collectively, lubricating agents or additives). The mentioned lubricating non-aqueous surfactants (such as ethoxylated tallow diamine), non-surfactant additives (such as montan waxes, petroleum waxes and amide waxes) or acids (such as phosphoric acid additives) provide asphalt binder compositions that can be adequately mixed with aggregate at temperatures 30-50° F. lower, even more than 50° F. lower, or as much as 100° F. lower than a substantially similar asphalt binder or cement that does not contain these lubricating additives or combinations thereof. In addition, these asphalt/aggregate mixtures can be compacted at temperatures 30-50° F. lower, even temperatures more than 50° F. lower, or as much as 100° F. lower than a substantially similar asphalt/aggregate mixture that does not contain a lubricating additive or combinations thereof. The asphalt binder compositions and aggregate mixtures that contain lubricating agents or additives disclosed in the present application may also include liquid antistripping additives used in conventional asphalt/aggregate mixtures. These asphalt binder compositions and aggregate mixtures can be used for forming paved surfaces in general, and therefore, may also be used as a surface treatment.

U.S. Pat. No. 8,382,890 B2 discloses asphalt mixtures obtained by mixing bituminous product(s) with aggregate(s). These asphalt mixtures can especially be used for producing materials in the field of sealing, construction and repair of road coverings, pavements, cycle paths, parking areas, aircraft runways, etc. The asphalt mixtures comprise at least one aggregate, at least one bituminous product and at least one additive characterized in that it contains at least one propoxylated and/or ethoxylated phosphorus alkyl compound, the additive optionally containing pyrophosphate of propoxylated and/or ethoxylated phosphorus alkyl compound and phosphoric acid. The presence of an additive means that the operating temperatures for mixing, laying and/or compacting the asphalt mixtures may be reduced by up to 50° C.

WO2012059810 discloses an additive that modifies the rheological properties of warm mix asphalt, and makes it possible to mix and compact asphalt mixtures at a temperature reduced by up to 35° C. The additive is constituted by wax, an adhesion-improving additive, a fluxing agent, and optionally a mineral oil. The fluxing agent comprises at least one compound selected from a fatty alkyl nitrile, a dimer nitrile, or an aminonitrile. The advantages of additive addition lie in reducing asphalt oxidation, causing it to be less-aged and more resistant to fatigue, reducing the interfacial tension between the aggregate and the asphalt, increasing adhesion between them, making the mixture resistant to the damages caused by humidity, increasing resistance to permanent deformation, causing gas emissions to be reduced and leading to savings in fuel consumption.

From the state of the art described above, it can be seen that there is still a need for warm mix asphalt compositions for use as a pavement surface treatment, and which are suitable for application to an already existing surface or base course pavement to prolong its service life, correct rutting problems, increase roughness (increase the friction coefficient) and increase regularity (decrease of the IRI "International Roughness Index" according to European Standard NLT-330). Furthermore, the warm mix asphalt compositions should have similar mechanical properties to hot mix asphalt compositions, and should exhibit satisfactory behavior in terms of compaction degree, adhesion and resistance to oxidation and fatigue. Furthermore, there is a need for an improved and more efficient method for obtaining such warm mix asphalt compositions which comprises fewer steps.

SUMMARY OF THE INVENTION

A first aspect of the present disclosure is a warm mix asphalt additive comprising:
(a) a wax;
(b) a phosphoric ester; and
(c) a fatty amine.

Preferably, component (a) is a synthetic wax. More preferably, component (a) is a polyethylene wax, a Fischer-Tropsch wax, or a fatty amide wax. Most preferably, component (a) is a saturated fatty amide wax.

Preferably, component (b) is a phosphoric ester derived from linear or branched alkyl alcohols containing 14, 16, or 18 carbon atoms or from linear or branched ethoxylated alkyl alcohols containing 12 or 14 carbon atoms. More preferably, component (b) is a C16-18-alkyl phosphoric ester, most preferably a mono-C16-18-alkyl phosphoric ester.

In one embodiment, component (b) is an alkyl phosphoric ester according to Formula (I):

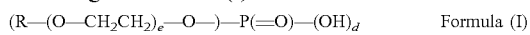

$(R-(O-CH_2CH_2)_e-O-)_c-P(=O)-(OH)_d$    Formula (I)

wherein P is a phosphorus atom, c is a number from 1 to 3, d is a number from 0 to 2, c+d is equal to 3, R is independently a hydrocarbon group containing from 8 to 20 carbon atoms and e is a number from 0 to 5. Preferably, R is independently a hydrocarbon group containing from 10 to 18 carbon atoms. Preferably, R is independently a hydrocarbon group containing from 12 to 18 carbon atoms. Preferably, R is independently a hydrocarbon group containing from 14 to 18 carbon atoms. Most preferably, R is independently a hydrocarbon group containing from 16 to 18 carbon atoms.

Preferably, component (c) is a fatty amine. Preferably, component (c) is an aliphatic fatty amine. Suitable aliphatic fatty amines include primary amines, dialkyl tertiary amines, polyamines, cyanoamines and mixtures thereof. Most preferably, component (c) is a primary tallow amine or a tallow polyamine or a mixture thereof.

More preferably, component (c) is a compound according to Formula (II):

Formula (II)

$$\begin{array}{c} R_1 \\ \diagdown \\ N-(A-NR_3)_p-R_4 \\ \diagup \\ R_2 \end{array}$$

where
- R₁ represents a hydrocarbon group, saturated or unsaturated, containing from 8 to 22 carbon atoms,
- R₂ represents a hydrocarbon group, saturated or unsaturated, containing from 8 to 22 carbon atoms, a hydrogen atom, or a group represented by the formula: (R—O)$_m$—H, where
- R—O represents an alkylene oxide group containing 2 or 3 carbon atoms, preferably 2 carbon atoms, and m is a number from 1 to 30;
- R₃ and R₄ are, independently, a hydrogen atom or a group represented by the formula: (R'O)$_q$—H, where R'O represents an alkylene oxide group containing 2 or 3 carbon atoms, preferably 2 carbon atoms, and q is a number from 1 to 30.

A is an ethylene or propylene group, and p is an integer from 1 to 5.

One embodiment of the first aspect of the present disclosure is a warm mix asphalt additive, comprising:
(a) a fatty amide wax;
(b) a C16-C18 alkyl phosphoric ester; and
(c) a fatty amine.

A second aspect of the present disclosure is a warm mix asphalt binder composition comprising asphalt and a warm mix asphalt additive. The warm mix asphalt additive comprises components (a) to (c) as defined above, including their preferred, their more preferred, and their most preferred embodiments. Preferably, the warm mix asphalt additive comprises: (a) a wax; (b) a phosphoric ester; and (c) a fatty amine. More preferably, the warm mix asphalt additive comprises: (a) a fatty amide wax; (b) a C16-C18 alkyl phosphoric ester; and (c) a fatty amine.

A third aspect of the present disclosure is a warm mix asphalt composition comprising a warm mix asphalt binder according to the present disclosure and aggregate. Preferably, the warm mix asphalt binder composition comprises asphalt and a warm mix asphalt additive. The warm mix asphalt additive comprises components (a) to (c) as defined above, including their preferred, their more preferred, and their most preferred embodiments. Preferably, the warm mix asphalt additive comprises: (a) a wax; (b) a phosphoric ester; and (c) a fatty amine. More preferably, the warm mix asphalt additive comprises: (a) a fatty amide wax; (b) a C16-C18 alkyl phosphoric ester; and (c) a fatty amine.

A fourth aspect of the present disclosure is a method for preparing the warm mix asphalt binder composition described herein, comprising the steps of:
1) heating asphalt at a temperature in the range of 150 to 160° C.;
2) adding component (a);
3) maintaining the temperature in the range of 150 to 160° C. and adding component (c); and
4) adding component (b).

In a preferred embodiment, component (a) is a wax, preferably a fatty amide wax; component (b) is a phosphoric ester, preferably a C16-C18 alkyl phosphoric ester; and component (c) is a fatty amine.

A fifth aspect of the present disclosure is a method for preparing the warm mix asphalt composition described herein, comprising mixing the warm mix asphalt binder composition as defined herein with aggregate at a temperature in the range of 130 to 150° C.

A sixth aspect of the present disclosure is the use of the warm mix asphalt composition as described herein as a pavement surface treatment.

A seventh aspect of the present disclosure is a method of surface treatment paving comprising the steps of:

A. Preparing a warm mix asphalt binder composition comprising:
   i) asphalt; and
   ii) a warm mix asphalt additive comprising:
      (a) a wax, preferably a fatty amide wax;
      (b) a phosphoric ester, preferably a C16-C18 alkyl phosphoric ester; and
      (c) at least one fatty amine.

B. Combining the warm mix asphalt binder composition as defined in A with aggregate to form a warm mix asphalt composition.

C. Applying the warm mix asphalt composition as defined in B on a surface course or base course of a pavement, wherein the temperature of the warm mix asphalt composition is in the range of 110 to 140° C.

D. Compacting the warm mix asphalt composition, wherein the temperature of the warm mix asphalt composition is in the range of 90 to 120° C. Preferably, in step B of the method of surface treatment paving, the warm mix asphalt binder composition is combined with aggregate at a temperature in the range of 130 to 150° C.

An eighth aspect of the present disclosure is a warm mix asphalt additive kit comprising the warm mix asphalt additive as described herein, wherein each one of components (a), (b) and (c) is contained in a separate container. Components (a), (b) and (c) are as defined above, including their preferred, their more preferred, and their most preferred embodiments.

In one embodiment of the eighth aspect of the present disclosure, the warm mix asphalt additive kit comprises:
(a) a wax;
(b) a phosphoric ester; and
(c) a fatty amine;
wherein, each one of components (a), (b) and (c) is contained in a separate container.

BRIEF DESCRIPTION OF THE FIGURES

FIG. 4 shows that the addition of either Danox AP or Kaoamin 20 to asphalt caused the greatest decrease in melting point.

DETAILED DESCRIPTION OF THE INVENTION

Figure 1:
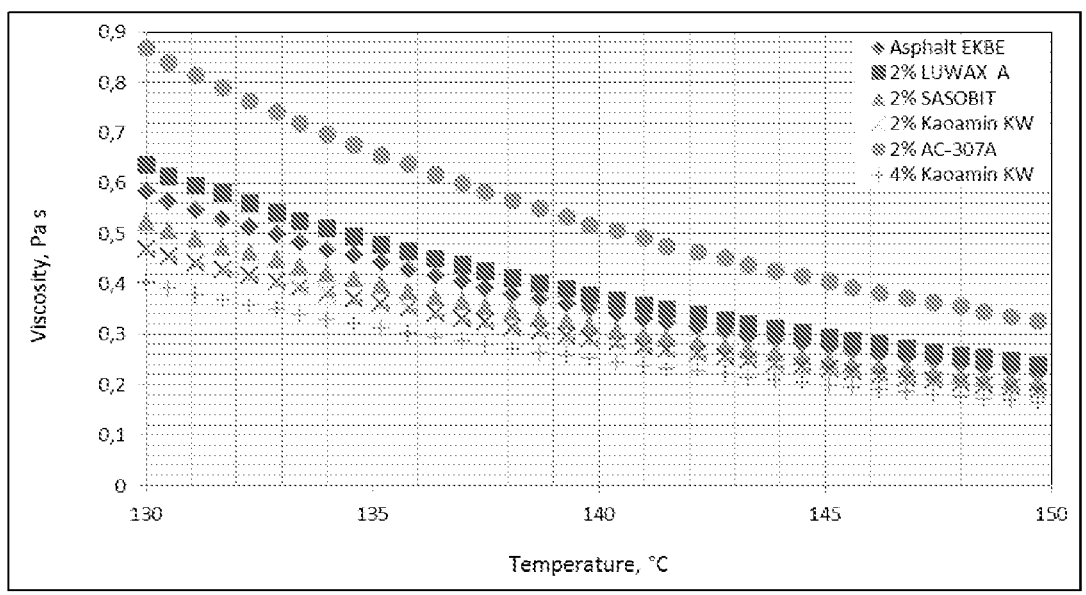
FIG. 1 is a graph showing the viscosity of asphalt at high temperatures using different types of waxes. From the graph it is clear that the commercial product Kaoamin KW causes asphalt to have a lower viscosity at temperatures in the range of 130 to 150° C. than the other commercial waxes.

The term "phosphoric ester" as used herein refers to the ester of a phosphoric acid.

The term "warm mix asphalt" as used herein refers to asphalt compositions having an overall mixing temperature in the range of 130 to 150° C., a laying temperature in the range of 110 to 140° C., and a compaction temperature in the range of 90 to 120° C.

Warm Mix Asphalt Additive

A first aspect of the present disclosure is a warm mix asphalt additive. The warm mix asphalt additive comprises a component (a), a component (b), and a component (c). Components (a), (b) and (c) are as defined above, including their preferred, their more preferred, and their most preferred embodiments. The objective of the additive is to modify the rheological properties of asphalt so it has reduced viscosity, decreased fragility, and additionally presents reduced aging and adhesion problems.

Component (a)

When manufacturing an asphalt composition, asphalt should effectively cover the surface of the aggregate used. The asphalt should therefore have a viscosity in the range of 0.1 to 0.5 Pa s, preferably in the range of 0.2 to 0.3 Pa s. This can be achieved by addition of a fluxing agent additive. However, fluxing agents often decrease the viscosity of asphalt at high ambient temperatures and can cause deformation with the passage of vehicles. A solution to this problem is to use an additive with a high melting point (higher than the maximum ambient temperature in the location where the asphalt mixture is applied) and low viscosity once melted to decrease the viscosity of the asphalt at the temperatures of mixing, laying and compaction. Amide waxes or a Fischer-Tropsch wax, among others, can be used for this purpose.

The warm mix asphalt additive of the present invention therefore comprises a component (a) which can be used to adjust the viscosity of the asphalt.

Component (a) is a wax. Preferably, component (a) is a synthetic wax, more preferably a polyethylene wax, a Fischer-Tropsch wax, or a saturated fatty amide wax; most preferably a saturated fatty amide wax.

In one embodiment of the present invention, component (a) is a saturated fatty amide wax that may be obtained from the reaction between a saturated fatty acid, preferably containing 16 to 18 carbon atoms, and a short-chain amine, preferably ethylenediamine. Most preferably, component (a) is a saturated tallow fatty amide wax.

Component (b)

In the manufacture of surface treatment asphalt compositions, aggregate having a smaller size than the aggregate usually employed for base course compositions should be used. Smaller-sized aggregate will have a greater specific surface area and consequently, a greater amount of asphalt will have to be added. The affinity of the asphalt for the aggregate should therefore be optimized. To accomplish this, the addition of a lubricating agent additive (surface tension reducer) is necessary.

The warm mix asphalt additive of the present disclosure therefore comprises a component (b) which increases the capacity of asphalt to cover the surface of aggregate without diminishing its softening point.

Preferably, component (b) is a phosphoric ester derived from linear or branched alkyl alcohols containing 14, 16, or 18 carbon atoms or from linear or branched ethoxylated alkyl alcohols containing 12 or 14 carbon atoms. More preferably, component (b) is a C16-18-alkyl phosphoric ester, most preferably a mono-C16-18-alkyl phosphoric ester.

In one embodiment, component (b) is an alkyl phosphoric ester according to Formula (I):

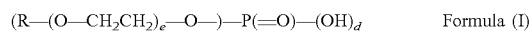

$$(R-(O-CH_2CH_2)_e-O-)_c-P(=O)-(OH)_d \qquad \text{Formula (I)}$$

wherein P is a phosphorus atom, c is a number from 1 to 3, d is a number from 0 to 2, c+d is equal to 3, R is independently a hydrocarbon group containing from 8 to 20 carbon atoms and e is a number from 0 to 5. Preferably, R is independently a hydrocarbon group containing from 10 to 18 carbon atoms. Preferably, R is independently a hydrocarbon group containing from 12 to 18 carbon atoms. Preferably, R is independently a hydrocarbon group containing from 14 to 18 carbon atoms. Most preferably, R is independently a hydrocarbon group containing from 16 to 18 carbon atoms.

Component (b) may also be selected from a compound which is able to increase the capacity of asphalt to cover the surface of aggregate without diminishing its softening point, such as an amidoamine or a silane.

Component (c)

By adding a wax (component (a)) to increase the viscosity of an asphalt composition, the stiffness of the asphalt composition at low environmental temperatures may be increased. In order to counteract this effect, a fluxing agent can be added to the composition which should decrease the viscosity of asphalt in the mixing, laying and compaction steps, increase the softening point of the asphalt when exposed to temperatures above 75° C., so that the asphalt composition is not easily deformed, and increase the penetration of asphalt at 25° C. to at least 65 tenths of mm to prevent the asphalt composition from showing evidence of fatigue and cracking. The fluxing agent should also increase the aggregate-asphalt adhesion.

The warm mix asphalt additive of the present disclosure therefore comprises a component (c) to improve the aggregate-asphalt adhesion.

Preferably, component (c) is a fatty amine. Preferably, component (c) is an aliphatic fatty amine. Suitable aliphatic fatty amines include primary amines, dialkyl tertiary amines, polyamines and cyanoamines. Most preferably, component (c) is a primary tallow amine or a tallow polyamine or a mixture thereof.

More preferably, component (c) is a compound according to Formula (II):

Formula (II)

$$\begin{array}{c} R_1 \\ \phantom{R}\diagdown \\ \phantom{RR}N-(A-NR_3)_p-R_4 \\ \phantom{R}\diagup \\ R_2 \end{array}$$

where
- $R_1$ represents a hydrocarbon group, saturated or unsaturated, containing from 8 to 22 carbon atoms,
- $R_2$ represents a hydrocarbon group, saturated or unsaturated, containing from 8 to 22 carbon atoms, a hydrogen atom, or a group represented by the formula: $(R-O)_m-H$, where
- R—O represents an alkylene oxide group containing 2 or 3 carbon atoms, preferably 2 carbon atoms, and m is a number from 1 to 30;
- $R_3$ and $R_4$ are, independently, a hydrogen atom or a group represented by the formula: $(R'O)_q-H$, where R'O represents an alkylene oxide group containing 2 or 3 carbon atoms, preferably 2 carbon atoms, and q is a number from 1 to 30.

A is an ethylene or propylene group, and p is an integer from 1 to 5.

Each of the embodiments, preferred embodiments, more preferred embodiments, and most preferred embodiments of component (a) as defined above, may be combined with any of the embodiments, preferred embodiments, more preferred embodiments or most preferred embodiments of component (b) and any of the embodiments, preferred embodiments, more preferred embodiments or most preferred embodiments of component (c). For example, a preferred embodiment of component (a), a synthetic wax, may be combined with a more preferred embodiment of component (b), a C16-18-alkyl phosphoric ester, and a preferred embodiment of component (c), an aliphatic fatty amine.

Each of the embodiments, preferred embodiments, more preferred embodiments, and most preferred embodiments of component (b) as defined above, may be combined with any of the embodiments, preferred embodiments, more preferred embodiments or most preferred embodiments of component (a) and any of the embodiments, preferred embodiments, more preferred embodiments or most preferred embodiments of component (c). For example, a preferred embodiment of component (b), a phosphoric ester derived from linear or branched alkyl alcohols containing 14, 16, or 18 carbon atoms, may be combined with a most preferred embodiment of component (a), a saturated tallow fatty amide wax, and a most preferred embodiment of component (c), a primary tallow amine.

Each of the embodiments, preferred embodiments, more preferred embodiments, and most preferred embodiments of component (c) as defined above, may be combined with any of the embodiments, preferred embodiments, more preferred embodiments or most preferred embodiments of component (a) and any of the embodiments, preferred embodiments, more preferred embodiments or most preferred embodiments of component (b). For example, a most preferred embodiment of component (c), a primary tallow amine, may be combined with a preferred embodiment of component (a), a synthetic wax, and a most preferred embodiment of component (b), a mono-C16-18-alkyl phosphoric ester.

In one embodiment of the first aspect of the present disclosure, component (a) of the warm mix asphalt additive is a Fischer-Tropsch wax; component (b) of the warm mix asphalt additive is a phosphoric ester derived from a linear or branched alkyl alcohol containing 14, 16, or 18 carbon atoms; and component (c) of the warm mix asphalt additive is a dialkyl tertiary amine.

In another embodiment of the first aspect of the present disclosure, component (a) of the warm mix asphalt additive is a saturated fatty amide wax; component (b) of the warm mix asphalt additive is a mono-C16-18-alkyl phosphoric ester; and component (c) of the warm mix asphalt additive is a primary tallow amine or a tallow polyamine.

In another embodiment of the first aspect of the present disclosure, component (a) of the warm mix asphalt additive is N,N'-ethylenedi(stearamide) (Kaoamin KW); component (b) of the warm mix asphalt additive is an iso-C16-17 phosphate ester such as Gripper 67; and component (c) of the warm mix asphalt additive is a mixture of tallow and ditallow amines such as Danox AP.

Component (a) of the additive as defined above, including its preferred, its more preferred, and its most preferred embodiments, is present in an effective quantity in the warm mix asphalt additive. Preferably, it is present in the range of 30 to 80% wt., more preferably in the range of 40 to 75% wt., preferably in the range of 35 to 45% wt. or in the range of 65 to 75% wt. based on the total weight of the warm mix asphalt additive.

Component (b) of the additive as defined above, including its preferred, its more preferred, and its most preferred embodiments, is present in an effective quantity in the warm mix asphalt additive. Preferably, it is present in the range of 1 to 15% wt., more preferably in the range of 3 to 12% wt., most preferably in the range of 5 to 11% wt. based on the total weight of the warm mix asphalt additive.

Component (c) of the additive as defined above, including its preferred, its more preferred, and its most preferred embodiments, is present in an effective quantity in the warm mix asphalt additive. Preferably, it is present in the range of 10 to 60% wt., more preferably in the range of 15 to 55% wt., based on the total weight of the warm mix asphalt additive.

In one embodiment of the first aspect of the present disclosure, the warm mix asphalt additive comprises components (a), (b) and (c) as defined above, including their preferred, their more preferred, and their most preferred embodiments, wherein component (a) is present in the range of 35 to 45% wt., based on the total weight of the warm mix asphalt additive; component (b) is present in the range of 1 to 10% wt., based on the total weight of the warm mix asphalt additive; and component (c) is present in the range of 45 to 55% wt., based on the total weight of the warm mix asphalt additive. A warm mix asphalt additive according to this embodiment may be suitable for use in cold climates, where the ambient temperature is in the range of −20 to 25° C.

In one embodiment of the first aspect of the present disclosure, the warm mix asphalt additive comprises components (a), (b) and (c) as defined above, including their preferred, their more preferred, and their most preferred embodiments, wherein component (a) is present in the range of 65 to 75% wt., based on the total weight of the warm mix asphalt additive; component (b) is present in the range of 5 to 15% wt., based on the total weight of the warm mix asphalt additive; and component (c) is present in the range of 15 to 25% wt., based on the total weight of the warm mix asphalt additive. A warm mix asphalt additive according to this embodiment may be suitable for use in hot climates, where the ambient temperature is in the range of 0 to 45° C.

Warm Mix Asphalt Binder Composition

A second aspect of the present disclosure is a warm mix asphalt binder composition comprising asphalt and a warm mix asphalt additive. The warm mix asphalt additive comprises components (a) to (c) as defined above, including their preferred, their more preferred, and their most preferred embodiments. Preferably, the warm mix asphalt additive comprises: (a) a wax; (b) a phosphoric ester; and (c) a fatty amine. More preferably, the warm mix asphalt additive comprises: (a) a fatty amide wax; (b) a C16-C18 alkyl phosphoric ester; and (c) a fatty amine.

Component (a) of the additive as defined above, including its preferred, its more preferred, and its most preferred embodiments, is present in an effective quantity in the warm mix asphalt binder composition. Preferably, it is present in the range of 0.5 to 10% wt., more preferably in the range of 1 to 7% wt., most preferably in 3.5% wt. based on the total weight of asphalt in the composition.

Component (b) of the additive as defined above, including its preferred, its more preferred, and its most preferred embodiments, is present in an effective quantity in the warm mix asphalt binder composition. Preferably, it is present in the range of 0.1 to 2.0% wt., more preferably in the range of 0.1 to 0.7% wt., most preferably in 0.5% wt. based on the total weight of asphalt in the composition.

Component (c) of the additive as defined above, including its preferred, its more preferred, and its most preferred embodiments, is present in an effective quantity in the warm mix asphalt binder composition. Preferably, it is present in the range of 0.3 to 15.0% wt., more preferably in the range of 0.5 to 8.0% wt., most preferably in the range of 0.5 to 4.5% wt. based on the total weight of asphalt in the composition.

Asphalt

The warm mix asphalt binder composition of the present invention comprises asphalt. When employed in a warm mix asphalt composition, the asphalt functions by binding together the aggregate material and thus limits its mobility when a load is applied.

In one embodiment of the second aspect of the present invention, the asphalt in the warm mix asphalt binder composition is neat asphalt (bituminous product). Other types of asphalt may also be used in the warm mix asphalt binder composition. Experimental data has been obtained with EKBE (commercial name of asphalt manufactured by PEMEX), and also with PG 64-22 asphalt and AC-20 asphalt.

The additive comprising component (a), component (b), and component (c), as defined above, including their preferred, their more preferred, and their most preferred embodiments, is combined with asphalt to provide an asphalt binder composition having the following properties:

1. Reduced viscosity when working at temperatures in the range of 100 to 150° C. This ensures that the capacity of asphalt to cover the surface of aggregate is increased and means that the resulting asphalt composition can be applied using the same machinery used when working with hot mix asphalt compositions (i.e., it does not require special equipment).

2. Increased softening point so that it is in the range of 70 to 115° C. (according to ASTM D-36 and AASHTO T-53 standards). This renders the applied asphalt mixture resistant to damage (rutting) favored by high environmental temperatures.

3. Increased asphalt penetration in the range of 40 to 80 tenths of mm at a temperature of 25° C.; thus the asphalt composition applied is resistant to damage (fatigue and thermal cracking) caused by low environmental temperatures.

Warm Mix Asphalt Composition

A third aspect of the present disclosure is a warm mix asphalt composition comprising a warm mix asphalt binder composition and aggregate. The warm mix asphalt composition is resistant to permanent deformation, to cracking caused by fatigue or temperature, to oxidation, and to damage caused by humidity.

The warm mix asphalt binder composition comprises asphalt and a warm mix asphalt additive. The warm mix asphalt additive comprises components (a) to (c) as defined above, including their preferred, their more preferred, and their most preferred embodiments. Preferably, the warm mix asphalt additive comprises: (a) a wax; (b) a phosphoric ester; and (c) a fatty amine. More preferably the warm mix asphalt additive comprises: (a) a fatty amide wax; (b) a C16-C18 alkyl phosphoric ester; and (c) a fatty amine.

Aggregate

The warm mix asphalt composition of the present invention comprises aggregate.

According to the size of the crushed stone materials or aggregates, the aggregate can be classified as coarse aggregate or fine aggregate. Gradation refers to the determination of the aggregate particle-size distribution. Gradation limits and maximum aggregate size are specified because these properties affect the amount of aggregate and determine which properties the asphalt should have to ensure the workability, manageability and the durability of the final asphalt mixture.

Coarse aggregate refers to aggregate which is retained on a 4.75 mm IS sieve and only contains so much finer material as permitted by specification. Coarse aggregate may be described as crushed or partially crushed gravel or stone.

Fine aggregate refers to aggregate most of which passes through a 4.75 mm IS sieve and only contains so much coarser material as permitted by specification. Fine aggregate may be described as natural sand, crushed stone sand, and crushed gravel sand. According to size, the fine aggregate may be described as coarse sand, medium sand and fine sand.

In a preferred embodiment of the invention, the aggregate used is fine aggregate. This corresponds to type II and type III gradation according to the ISSA A-143 standard. Thus, the target (mix design) aggregate gradation (including the mineral filler) shall be within one of the following bands:

TABLE 1

| ISSA Type II and in Aggregate Gradation for Micro-Surfacing (ISSA A-143, 2005) | | | |
|---|---|---|---|
| Sieve size | Type II specification Percent passing | Type III specification Percent passing | Stockpile tolerance |
| ½ | 100 | 100 | — |
| ⅜" | 100 | 100 | — |
| #4 | 90-100 | 70-90 | ±5% |
| #8 | 65-90 | 45-70 | ±5% |
| #16 | 45-70 | 28-50 | ±5% |
| #30 | 30-50 | 19-34 | ±5% |
| #50 | 18-30 | 12-25 | ±4% |
| #100 | 10-21 | 7-18 | ±3% |
| #200 | 5-15 | 5-15 | ±2% |

According to origin, the crushed stone materials or aggregates can be divided into natural aggregate or reclaimed asphalt pavement (RAP) aggregate.

In a preferred embodiment of the present disclosure, the aggregate in the warm mix asphalt composition is a mixture of natural aggregate and reclaimed asphalt pavement (RAP) aggregate.

In one embodiment of the third aspect of the present disclosure, the aggregate contains 2 to 30 wt. % of reclaimed asphalt pavement aggregate, based on the total weight of aggregate in the warm mix asphalt composition. Preferably, the aggregate contains 5 to 20 wt. % of reclaimed asphalt pavement aggregate, based on the total weight of aggregate in the warm mix asphalt composition.

In a further embodiment of the third aspect of the present disclosure, the aggregate is present in the range of 85 to 98 wt. %, based on the total weight of the warm mix asphalt composition. Preferably, the aggregate is present in the range of 90 to 95 wt. %, based on the total weight of the warm mix asphalt composition.

Method for Preparing a Warm Mix Asphalt Binder Composition

A fourth aspect of the present disclosure is a method for preparing a warm mix asphalt binder composition comprising asphalt and an additive that comprises a component (a), a component (b) and a component (c). Components (a), (b) and (c) are as defined above, including their preferred, their more preferred, and their most preferred embodiments.

One embodiment of the fourth aspect of the present disclosure is a method of preparing a warm mix asphalt binder composition comprising the steps of:
  i) preparing an asphalt additive comprising a component (a), a component (b) and a component (c);
  ii) mixing the asphalt additive of step (i) with asphalt.

Components (a), (b) and (c) are as defined above, including their preferred, their more preferred, and their most preferred embodiments.

A further embodiment of the fourth aspect of the present disclosure is a method of preparing a warm mix asphalt binder composition comprising the steps of:
  i) heating asphalt at a temperature in the range of 130 to 170° C., preferably 150 to 160° C.;
  ii) adding component (a);
  iii) maintaining the temperature in the range of 130 to 170° C., preferably 150 to 160° C.; and adding component (c); and
  iv) adding component (b).

Components (a), (b) and (c) are as defined above, including their preferred, their more preferred, and their most preferred embodiments.

In step ii), after adding component (a), the mixture is preferably stirred until homogenized. The mixture may be stirred for 0.5 to 1 hour.

In step iii), after adding component (c), the mixture is preferably stirred for 10 to 20 minutes before adding component (b) in step iv).

After addition of component (b) in step iv), the mixture is preferably stirred for 10 to 20 minutes to give a warm mix asphalt binder composition.

Components (a), (b) and (c) are as defined above, including their preferred, their more preferred, and their most preferred embodiments.

Method for Preparing a Warm Mix Asphalt Composition

A fifth aspect of the present disclosure is a method for preparing a warm mix asphalt composition comprising a warm mix asphalt binder composition according to the present disclosure and aggregate.

The method comprises mixing a warm mix asphalt binder composition with aggregate at a temperature in the range of 130 to 150° C.

Such warm mix asphalt compositions are characterized by an overall mixing temperature in the range of 130 to 150° C., a laying temperature in the range of 110 to 140° C., and compaction temperature in the range of 90 to 120° C.

A sixth aspect of the present disclosure is the use of a warm mix asphalt composition as defined herein as a pavement surface treatment.

The warm mix asphalt composition as described herein may be applied on the surface course or the base course of a pavement. The application of a warm mix asphalt composition according to the present disclosure on the surface course or the base course of a pavement may be used to prolong the service life, correct rutting problems, increase the roughness (increase the friction coefficient) and the regularity (decrease of the IRI "International Roughness Index" according to European Standard NLT-330) of the surface.

The warm mix asphalt composition may be applied at a temperature in the range of 110 to 140° C.

Method of Surface Treatment Paving

A seventh aspect of the present disclosure is a method of surface treatment paving comprising the steps of:
  A. preparing a warm mix asphalt binder composition comprising
    i) asphalt; and
    ii) a warm mix asphalt additive comprising:
      (a) a wax;
      (b) a phosphoric ester; and
      (c) a fatty amine.
  B. combining the warm mix asphalt binder composition as defined in A with aggregate to form a warm mix asphalt composition.
  C. applying the warm mix asphalt composition as defined in B on a surface course or base course of a pavement, wherein the temperature of the warm mix asphalt composition is in the range of 110 to 140° C.
  D. compacting the warm mix asphalt composition, wherein the temperature of the warm mix asphalt composition is in the range of 90 to 120° C.

Preferably, in step B of the method of surface treatment paving, the warm mix asphalt binder composition is combined with aggregate at a temperature in the range of 130 to 150° C.

One embodiment of the seventh aspect of the present disclosure is a method of surface treatment paving comprising the steps of:
  A. preparing a warm mix asphalt binder composition comprising
    i) asphalt; and
    ii) a warm mix asphalt additive comprising:
      (a) a fatty amide wax;
      (b) a C16-C18 alkyl phosphoric ester; and
      (c) a fatty amine.
  B. combining the warm mix asphalt binder composition as defined in A with aggregate at a temperature in the range of 130 to 150° C. to form a warm mix asphalt composition.
  C. applying the warm mix asphalt composition as defined in B on a surface course or base course of a pavement, wherein the temperature of the warm mix asphalt composition is in the range of 110 to 140° C.
  D. compacting the warm mix asphalt composition, wherein the temperature of the warm mix asphalt composition is in the range of 90 to 120° C.

The aggregate used in step B of the methods may be type II and/or type III gradation according to ISSA A-143 guideline for micro-surfacing.

In step C the temperature of the warm mix asphalt composition may be in the range of 120 to 140° C. The warm mix asphalt composition may be applied at any time of day or night.

After step C the warm mix asphalt composition can have a thickness in the range of 0.5 to 1.5 cm, preferably 0.8 to 1.2 cm.

Independently of the type of old pavement used, the pavement can be previously coated with an asphalt emulsion characterized in that it has an asphalt content of at least 35%. Such asphalt mixture once compacted has a thickness in the range of 0.8 to 1.2 cm.

After application of the warm mix asphalt composition according to the methods described above, the roadway can be opened to traffic after a period of 30 minutes or less.

Kits

An eighth aspect of the present disclosure is a warm mix asphalt additive kit comprising the warm mix asphalt additive as described herein, wherein each one of components (a), (b) and (c) is contained in a separate container.

In one embodiment, the warm mix asphalt additive kit comprises:
(a) a wax;
(b) a phosphoric ester; and
(c) a fatty amine;
wherein, each one of components (a), (b) and (c) is contained in a separate container.

A further embodiment of the eighth aspect of the present disclosure is a warm mix asphalt additive kit comprising:
(a) a fatty amide wax;
(b) a C16-C18 alkyl phosphoric ester; and
(c) a fatty amine
wherein, each one of components (a), (b) and (c) is contained in a separate container.

In a further embodiment of the eight aspect of the present disclosure, two of components (a), (b) and (c) are mixed together and contained in one container. The remaining component is contained in a separate container. Components (a), (b) and (c) are as defined above, including their preferred, their more preferred, and their most preferred embodiments.

In one embodiment, components (a) and (b) are mixed together and contained in one container. In a further embodiment, components (a) and (c) are mixed together and contained in one container. In an additional embodiment, components (b) and (c) are mixed together and contained in one container. Components (a), (b) and (c) are as defined above, including their preferred, their more preferred, and their most preferred embodiments.

Preferably, component (a) is a synthetic wax. More preferably, component (a) is a polyethylene wax, a Fischer-Tropsch wax, or a fatty amide wax. Most preferably, component (a) is a saturated fatty amide wax.

Preferably, component (b) is a phosphoric ester derived from a linear or branched alkyl alcohol containing 14, 16, or 18 carbon atoms or from linear or branched ethoxylated alkyl alcohols containing 12 or 14 carbon atoms. More preferably, component (b) is a C16-18-alkyl phosphoric ester, most preferably a mono-C16-18-alkyl phosphoric ester.

In one embodiment, component (b) is an alkyl phosphoric ester according to Formula (I):

$$(R-(O-CH_2CH_2)_e-O-)_c-P(=O)-(OH)_d \quad \text{Formula (I)}$$

wherein P is a phosphorus atom, c is a number from 1 to 3, d is a number from 0 to 2, c+d is equal to 3, R is independently a hydrocarbon group containing from 8 to 20 carbon atoms and e is a number from 0 to 5. Preferably, R is independently a hydrocarbon group containing from 10 to 18 carbon atoms. Preferably, R is independently a hydrocarbon group containing from 12 to 18 carbon atoms. Preferably, R is independently a hydrocarbon group containing from 14 to 18 carbon atoms. Most preferably, R is independently a hydrocarbon group containing from 16 to 18 carbon atoms.

Preferably, component (c) is a fatty amine. Preferably, component (c) is an aliphatic fatty amine. Suitable aliphatic fatty amines include primary amines, dialkyl tertiary amines, polyamines, cyanoamines and mixtures thereof. Most preferably, component (c) is a primary tallow amine or a tallow polyamine or a mixture thereof.

More preferably, component (c) is a compound according to Formula (II):

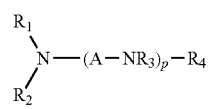

Formula (II)

where
$R_1$ represents a hydrocarbon group, saturated or unsaturated, containing from 8 to 22 carbon atoms,
$R_2$ represents a hydrocarbon group, saturated or unsaturated, containing from 8 to 22 carbon atoms, a hydrogen atom, or a group represented by the formula: $(R-O)_m$—H, where
R—O represents an alkylene oxide group containing 2 or 3 carbon atoms, preferably 2 carbon atoms, and m is a number from 1 to 30;
$R_3$ and $R_4$ are, independently, a hydrogen atom or a group represented by the formula: $(R'O)_q$—H, where R'O represents an alkylene oxide group containing 2 or 3 carbon atoms, preferably 2 carbon atoms, and q is a number from 1 to 30.
A is an ethylene or propylene group, and p is an integer from 1 to 5.

In another embodiment of the eighth aspect of the present disclosure, component (a) of the warm mix asphalt additive kit is N,N'-ethylenedi(stearamide) (Kaoamin KW); component (b) of the warm mix asphalt additive kit is an iso-C16-17 phosphate ester such as Gripper 67; and component (c) of the warm mix asphalt additive kit is a mixture of tallow and ditallow amines such as Danox AP.

Component (a) in the warm mix asphalt additive kit, as defined above, including its preferred, its more preferred, and its most preferred embodiments, is preferably present in the range of 30 to 80% wt., more preferably in the range of 40 to 75% wt., preferably in the range of 35 to 45% wt. or in the range of 65 to 75% wt. based on the total weight of components (a), (b), and (c) in the warm mix asphalt additive kit.

Component (b) in the warm mix asphalt additive kit, as defined above, including its preferred, its more preferred, and its most preferred embodiments, is preferably present in the range of 1 to 15% wt., more preferably in the range of 3 to 12% wt., most preferably in the range of 5 to 11% wt. based on the total weight of components (a), (b), and (c) in the warm mix asphalt additive kit.

Component (c) in the warm mix asphalt additive kit, as defined above, including its preferred, its more preferred, and its most preferred embodiments, is preferably present in the range of 10 to 60% wt., more preferably in the range of 15 to 55% wt., based on the total weight of components (a), (b), and (c) in the warm mix asphalt additive kit.

In one embodiment of the eighth aspect of the present disclosure, the warm mix asphalt additive kit comprises components (a), (b) and (c) as defined above, including their preferred, their more preferred, and their most preferred embodiments, wherein component (a) is present in the range of 35 to 45% wt., based on total weight of components (a), (b), and (c) in the warm mix asphalt additive kit; component (b) is present in the range of 1 to 10% wt., based on the total weight of components (a), (b), and (c) in the warm mix asphalt additive kit; and component (c) is present in the range of 45 to 55% wt., based on the total weight of components (a), (b), and (c) in the warm mix asphalt additive kit. A warm mix asphalt additive kit according to this embodiment may be suitable for use in cold climates, where the ambient temperature is in the range of −20 to 25° C.

In one embodiment of the eighth aspect of the present disclosure, the warm mix asphalt additive kit comprises components (a), (b) and (c) as defined above, including their preferred, their more preferred, and their most preferred embodiments, wherein component (a) is present in the range of 65 to 75% wt., based on the total weight of components (a), (b), and (c) in the warm mix asphalt additive kit; component (b) is present in the range of 5 to 15% wt., based on the total weight of components (a), (b), and (c) in the warm mix asphalt additive kit; and component (c) is present in the range of 15 to 25% wt., based on the total weight of components (a), (b), and (c) in the warm mix asphalt additive kit. A warm mix asphalt additive kit according to this embodiment may be suitable for use in hot climates, where the ambient temperature is in the range of 0 to 45° C.

The following examples are intended to illustrate the present invention, but should not be considered as limiting the scope of the present invention.

Examples

Viscosities were Measured According to One of the Following Methods:
Method 1: Asphalt Viscosity was Measured Using the Following Conditions:
 Device: Dynamic Shear Rheometer (DSR)
 Geometry: 25-mm-diameter parallel plates, Gap: 1000 microns.
 Initial Temperature: 80° C., Temperature ramp from 80 to 150° C. and Ramp rate: 3.50° C./min
 Shear rate: 37.50 s$^{-1}$
Method 2: Mastic Asphalt Viscosity was Measured Using the Following Conditions:
 Device: Dynamic Shear Rheometer (DSR)
 Geometry: 25-mm-diameter parallel plates, Gap: 1000 microns.
 Initial Temperature: 90° C., Temperature ramp from 90 to 150° C. and Ramp rate: 3.50° C./min
 Shear rate: 1.00 s$^{-1}$ Example I Selection of Warm Mix Asphalt Additive Components
Component (a)
 Kaoamin KW commercial product, which is N, N'-ethylenedi(stearamide), has been designated as a suitable representative of component (a) for the purpose of the present invention.

The warm mix asphalt binder compositions of the invention must contain an additive that is able to decrease the viscosity of asphalt at temperatures in the range of 120 to 150° C. and at the same time increase the viscosity of asphalt at temperatures in the range of 50 to 80° C. To achieve this, waxes are used. Different commercial waxes were studied. These waxes include: Sasobit that is a Fischer-Tropsch paraffin wax, Luwax that is a low-density oxidized polyethylene wax, and AC-307A that is a high-density oxidized polyethylene wax. It was found that the commercial product Kaoamin KW resulted in the greatest reduction of asphalt viscosity at temperatures in the range of 130 to 150° C. This is shown in FIG. 1.

In order to assess the increase of the softening point and the viscosity of asphalt at temperatures in the range of 50 to 80° C., the softening point of asphalt containing different commercially available waxes, as described above, or polymers (SBS or EGA) was evaluated (according to AASHTO T53 standard). Table 2 shows that addition of Kaoamin KW gave the highest softening point of asphalt.

TABLE 2

Softening Point of Asphalt With and Without Waxes and Polymers

|  | Softening point (° C.) |
| --- | --- |
| Asphalt AC-20 "EKBE" | 55 |
| EKBE + 2% of Sasobit | 69 |
| EKBE + 2% of Kaoamin KW | 73 |
| EKBE + 4% of Sasobit | 83 |
| EKBE + 4% of Kaoamin KW | 98 |
| EKBE + 2% of SBS | 65 |
| EKBE + 1% of EGA | 69 |

Component (b)
 Gripper 67 commercial product, a iso-C16-17 phosphate ester, has been designated as a suitable representative of component (b) for the purpose of the present invention.

Figure 2:
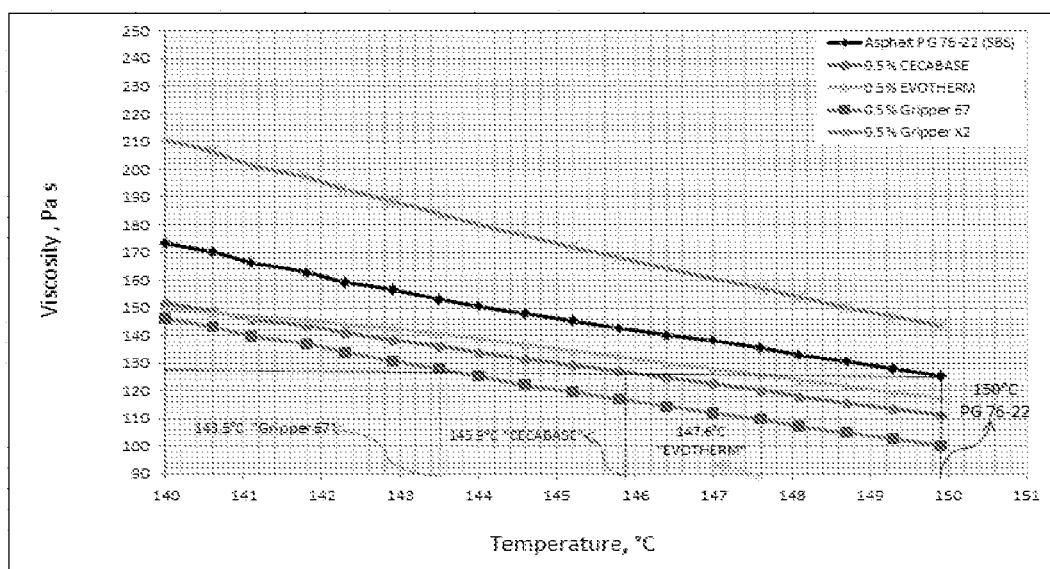
FIG. 2 is a graph showing the viscosity of mastic asphalts using asphalt modified with lubricating agents. Gripper 67 was found to cause the greatest decrease in viscosity.

The warm mix asphalt compositions of the invention need to be mixed, laid and compacted at reduced temperatures. For this purpose, lubricating agents are used. The best commercially available lubricating agents were selected to be added to the asphalt for making mastic asphalts (special mixtures of mineral filler and asphalt) in order to evaluate their viscosity at high temperatures, in the range of 140 to 150° C. Among these lubricating agents is Evotherm, (a mixture of fatty amidoamines), Cecabase RT (a mixture of fatty acids/tetraethylenepentamine polyamides), and Gripper X2 (a C8 phosphate ester). The results are shown in FIG. 2. It can be seen that the best performance was obtained when using Gripper 67.

Component (c)
 Danox AP commercial product, a mixture of tallow and ditallow amines, is a suitable component (c) compound.

Figure 3:
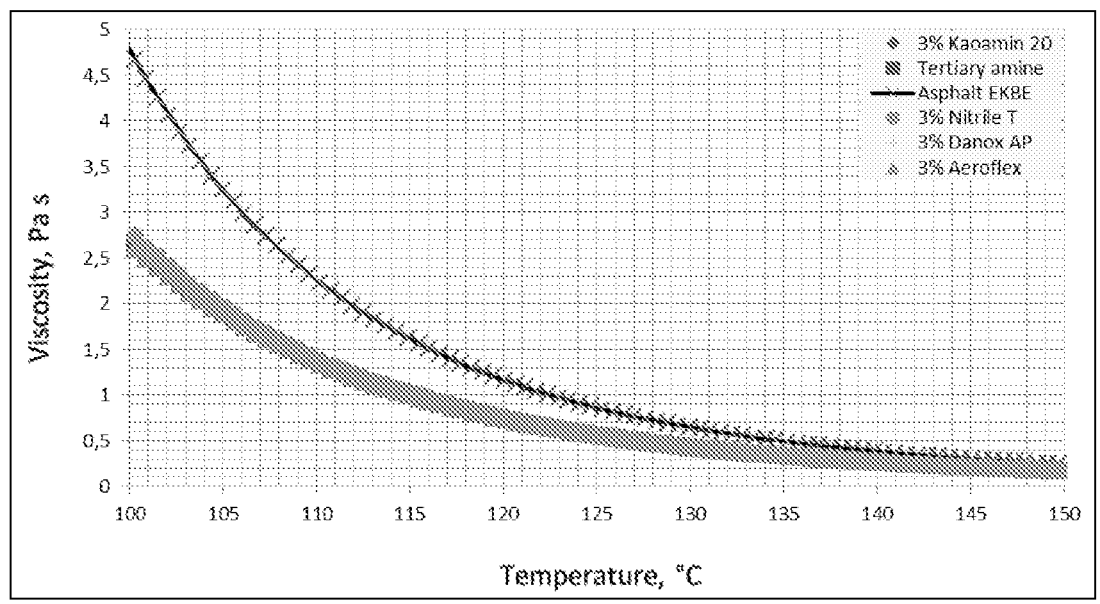
FIG. 3 is a graph showing the viscosity of asphalt modified with rejuvenating additives. From this figure it can be seen that almost all the rejuvenating additives tested reduced the viscosity of asphalt at temperatures in the range of 100 to 150° C.

As previously explained, the warm mix asphalt compositions of the present disclosure need to be mixed, laid and compacted at reduced temperatures. Therefore, rejuvenating additives can be included in the composition. The best commercially available rejuvenating agents were added to asphalt in order to assess its viscosity at temperatures in the range of 100 to 150° C. Among them is Nitrile T (tallow nitrile), a tertiary amine (a di-C12-14-alkyl tertiary amine), and Aereoflex (an aromatic oil). From the results shown in FIG. 3, it can be seen that almost all additives used reduced the viscosity of asphalt at high temperatures.

Figure 4:
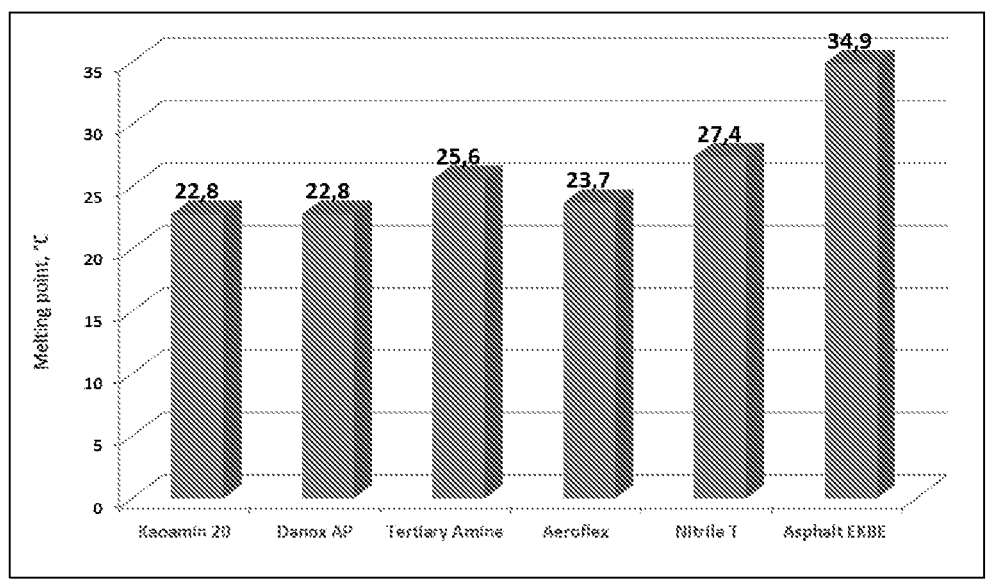
FIG. 4 is a bar chart showing the melting point of asphalt modified with rejuvenating additives after PAV.

Nevertheless, reduction of asphalt viscosity at high temperatures is not the only property that rejuvenating agents should impart. Another important property that the addition of rejuvenating agents should impart is the resistance of asphalt to be oxidized. To evaluate the same, the melting point of asphalt, containing different commercially available rejuvenating agents (the temperature at which the phase angle is 45°), after having performed the oxidation tests RTFO (according to AAHSTO T240 standard) and PAV (according to AASHTO R28 standard), was determined. FIG. 4 shows that Danox AP together with Kaoamin 20 provided the lowest melting point, indicating the same the highest resistance of asphalt to oxidation.

Example II

Characteristics of the Warm Mix Asphalt Compositions

To reduce the viscosity of asphalt, various asphalt compositions containing Kaomin KW and Danox AP commercial products, as component (a) and component (c), respectively, were prepared. It was found that to facilitate mixing and compaction of the asphalt compositions, apart from reducing the viscosity of asphalt, the interfacial tension between asphalt and aggregate should be decreased. This can be achieved by adding the commercial product Gripper 67, as component (b).

Figure 5:
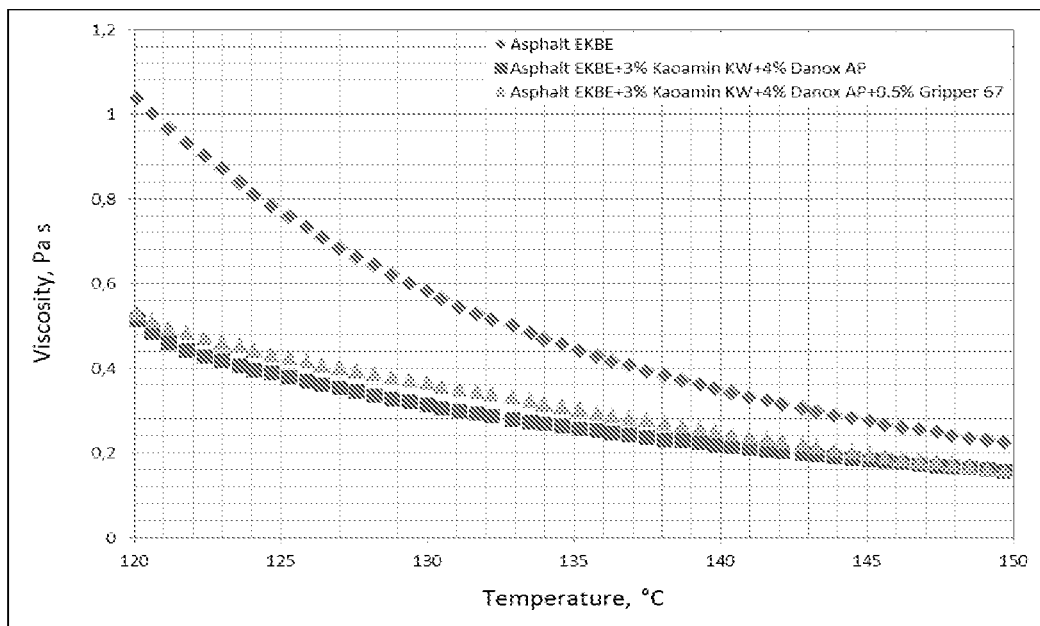
FIG. 5 is a graph showing the effect of the addition of additives on the viscosity of asphalt.

FIG. 5 shows reduction of the viscosity of asphalt at the temperatures in the range of 120 to 150° C. when using Kaomin KW and Danox AP as additives. It can be seen that further addition of Gripper 67 to asphalt does not further reduce the viscosity of asphalt.

The evaluation of the interfacial tension reduction was performed by measuring viscosity of the mastic asphalt. This was formed by mixing 70% of mineral filler, passing the ASTM sieve size #200, with 30% of asphalt containing component (a) and component (b) and component (c) at the temperatures in the range of 110 to 150° C.

Figure 6:
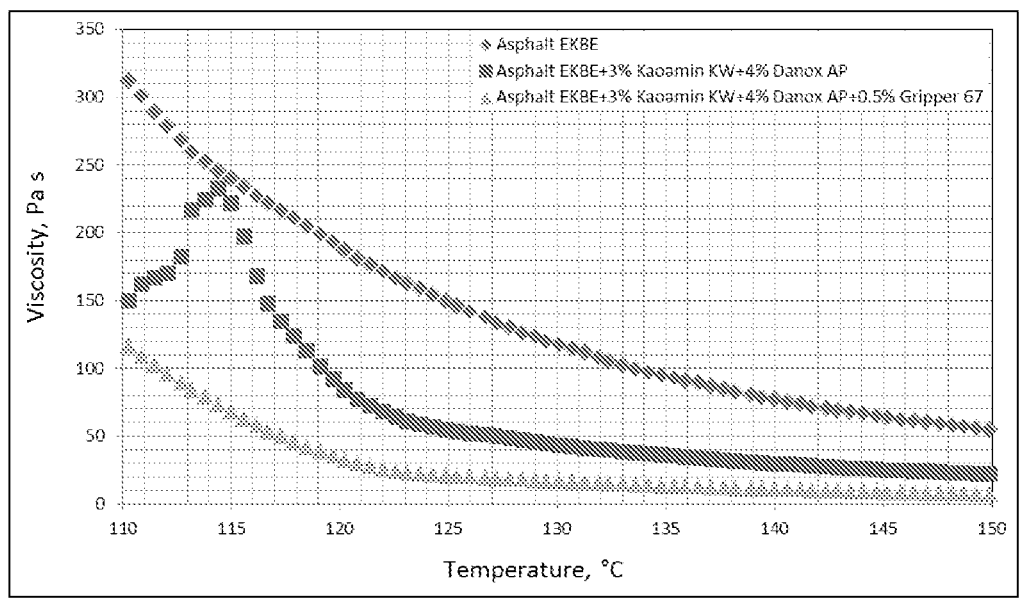
FIG. 6 is a graph showing viscosity reduction of mastic asphalts due to the addition of the additives.

FIG. 5 shows that adding Gripper 67 to asphalt does not result in a significant reduction in the viscosity of asphalt at the temperatures studied. FIG. 6 demonstrates that the addition of Gripper 67 has a large effect on the reduction of the viscosity of the mastic asphalt due to the decrease of the interfacial tension between asphalt and aggregate allowing better handling and compaction. It can be seen that the optimum formulation for reducing the viscosity of the mastic asphalt was obtained when 3% of Kaomin KW, 4% of Danox AP and 0.5% of Gripper 67 was added to asphalt.

Asphalt, being part of the warm mix asphalt compositions, should have a high softening point so that asphalt compositions approximately 1 cm thick when compacted are resistant to torque exerted by the rim of internal combustion vehicles at temperatures in the range of 50 to 80° C. When emulsified asphalt mixtures are applied to on pavement as a surface treatment of equivalent thickness, they usually show little resistance to torque and become deformed. Table 3 shows the softening point of neat asphalt, residue of asphalt emulsion and asphalt in which Kaomin KW and/or Gripper 67 and/or Danox AP are present as components (a), (b), and (c), respectively. It can be seen that the highest softening points were obtained for formulations D and E. Both of these formulations demonstrated a good performance in the field, although formulation D is suitable for use in hot climates and formulation E is suitable for use in cold climates.

TABLE 3

Effect of the Additives According to the Invention on the Softening Point of Asphalt

| Formulation | Additive | | | Softening point (° C.) |
| --- | --- | --- | --- | --- |
| | Kaomin KW (%) | Danox AP (%) | Gripper 67 (%) | |
| Neat asphalt | 0.0 | 0.0 | 0.0 | 55 |
| Residue of asphalt emulsion for microsurface | — | — | — | 57 |
| A | 2.0 | 0.0 | 0.0 | 73 |
| B | 0.0 | 3.0 | 0.0 | 49 |
| C | 0.0 | 0.0 | 0.5 | 56 |
| D | 3.5 | 1.5 | 0.5 | 103 |
| E | 3.5 | 4.0 | 0.5 | 88 |

Figure 7:
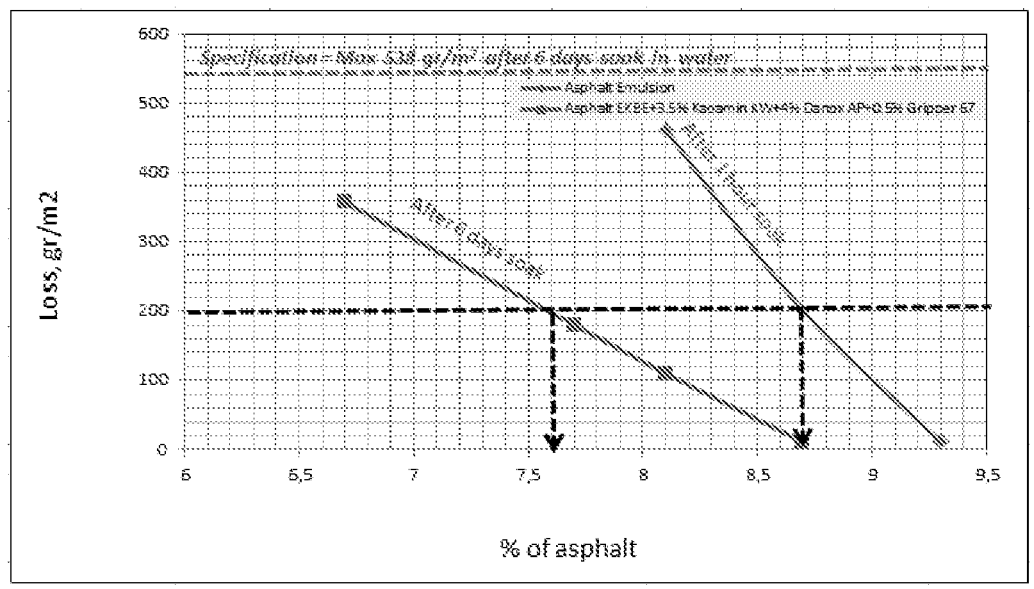
FIG. 7 is a graph comparing the results of the Wet Track Abrasion Test (WTAT) for the emulsified asphalt mixture and the warm mix asphalt composition of the invention.

Warm mix asphalt compositions of the present disclosure should be resistant to abrasion. To evaluate resistance to abrasion, the test called Wet Track Abrasion Test (WTAT), according to the guideline ISSA TB-100, was performed. This test assesses the damage of a surface pavement caused by moisture. The basaltic type aggregate from "La Vega" quarry was used in this test characterized in that it has a particle size of type III (guideline ISSA A-143). FIG. 7 shows that the best results were obtained when working with the asphalt composition comprising 3.5% of Kaoamin KW, 4.0% of Danox AP and 0.5% Gripper 67 as components (a), (c) and (b), respectively.

The particle size distribution of the aggregate used in the warm mix asphalt compositions of the present disclosure should be similar to that used for micro-surfacing in accordance with the requirements of the ISSA A-143 guideline (see Table 1).

Warm mix asphalt compositions of the present disclosure, once laid, should be capable of being handled at a minimum temperature of 100° C. so that they can be manipulated by site workers.

Warm mix asphalt compositions of the present disclosure should be capable of being mixed in a laying machine at a minimum temperature of 120° C.

Warm mix asphalt compositions of the present disclosure should be capable of being compacted at a minimum temperature of 95° C.

Warm mix asphalt compositions of the present disclosure should be capable of being extended with any laying machine.

Warm mix asphalt compositions of the present disclosure should be resistant to the action of water and should pass the WTAT test (according to the ISSA TB-100 standard).

To evaluate the use of RAP, crushed asphalt mixtures from the scarification of old asphalt binders were applied. The RAP material having a maximum nominal size of 9.5 mm was mixed with crushed aggregate having a particle size of type III (guideline ISSA A-143). The aggregate mixture was added to the asphalt modified with the additive proposed in this study.

Figure 8:
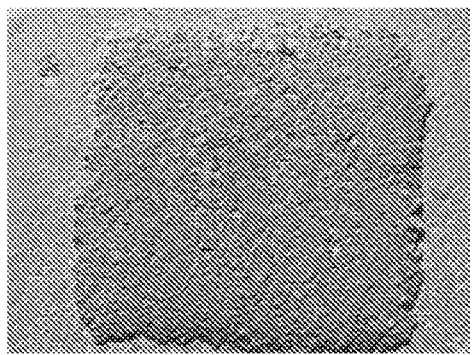
FIG. 8 in a photograph showing the appearance of a compacted asphalt composition according to the present disclosure.

Testing tiles of size 30 cm×30 cm were treated with an asphalt composition according to the present invention, as shown in table 4. FIG. 8 shows the appearance of the compacted asphalt composition.

TABLE 4

Tested Formulation of the Asphalt
Pavement Surface Treatment Composition
Tested formulation Modified asphalt

| Additive component | % based on the total weight of the asphalt in the composition |
|---|---|
| Kaoamin KW | 3.5 |
| Danox AP | 4.0 |
| Gripper 67 | 0.5 |

Mixture of aggregate

| Aggregate component | % based on the total weight of the aggregate in the composition |
|---|---|
| Crushed aggregate of type III | 80 |
| Recycled material | 20 |

Asphalt pavement surface treatment composition

| Pavement component | % based on the total weight of the composition |
|---|---|
| Modified asphalt | 4.8 |
| Mixture of aggregate | 95.2 |

The "IRI" irregularity decrease, the friction increase, and the permanent deformation reduction (rutting) of the existing asphalt layer, before and after application of the warm mix asphalt compositions of the invention, were evaluated.

The warm mix asphalt compositions according to the present invention should improve the irregularity of the already existing pavement.

Figure 9:
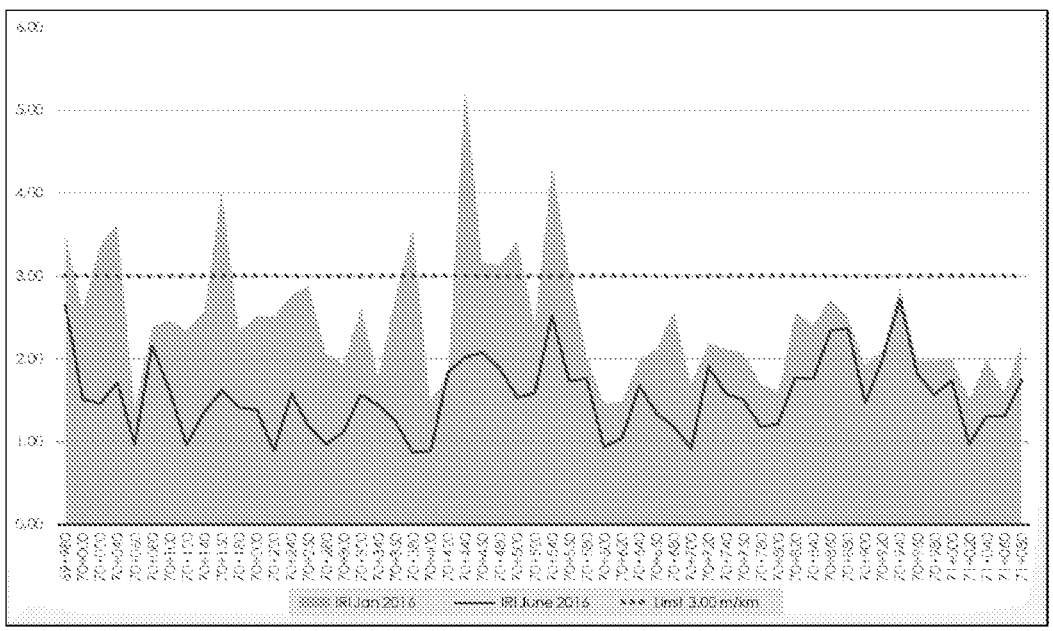
FIG. 9 is a graph showing the International Roughness Index (IRI) of a road before and after application of the warm mix asphalt composition according to the present disclosure.

Irregularity is expressed using the International Roughness Index (IRI), which may be obtained by measuring longitudinal road profiles. FIG. 9 shows that the IRI of the existing asphalt layer was in the range of 1,4-5.3 m/Km (the measurement was made on the old asphalt layer in January). After the application of the warm mix asphalt composition of the invention, the IRI decreased to 0.9-2.8 m/Km (the measurement was conducted immediately after the placement of the asphalt composition in June), being below the limit of suitability offered by commonly used asphalt technologies that is 3 m/Km.

The warm mix asphalt compositions of the present disclosure once laid, should increase the roughness (friction coefficient) of the already existing pavement.

Figure 10:
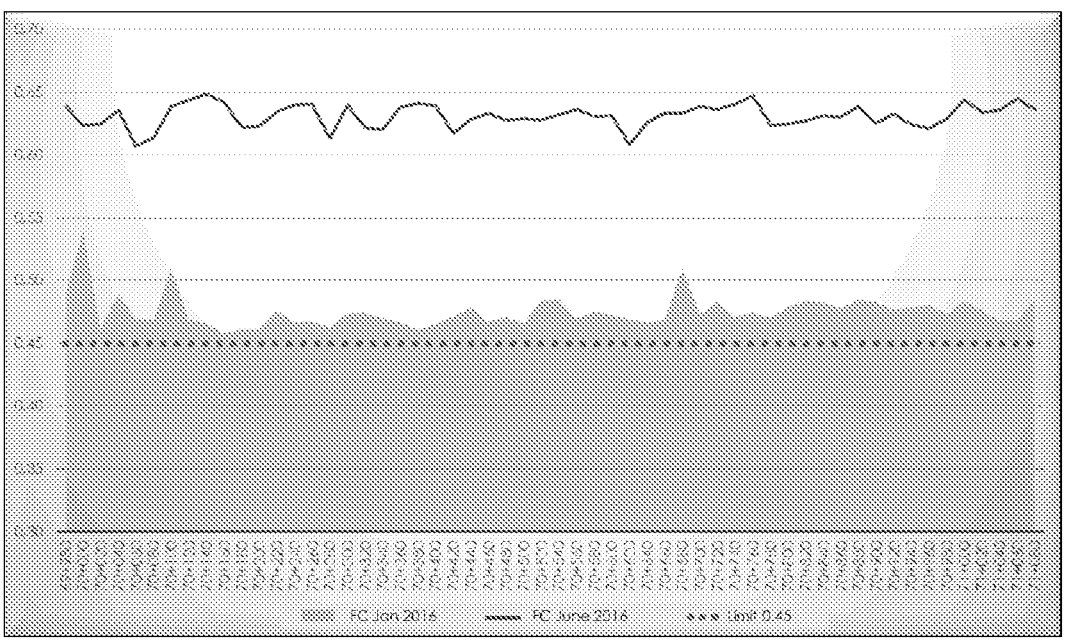
FIG. 10 is a graph showing the friction coefficient of a road before and after application of the warm mix asphalt composition according to the present disclosure.

As can be seen in FIG. 10, the friction coefficient (FC) of the existing asphalt layer was in the range of 0.30-0.54 (the measurement was performed on the old asphalt layer in January). After the application of the warm mix asphalt composition of the invention the roughness increased to the range of 0.60-0.65 (the measurement was conducted immediately after the placement of the asphalt composition in June), the limit of suitability offered by commonly used asphalt technologies is 0.45.

The warm mix asphalt compositions according to the present disclosure, once laid, should reduce the permanent deformation (rutting) of the already existing pavement.

Figure 11:
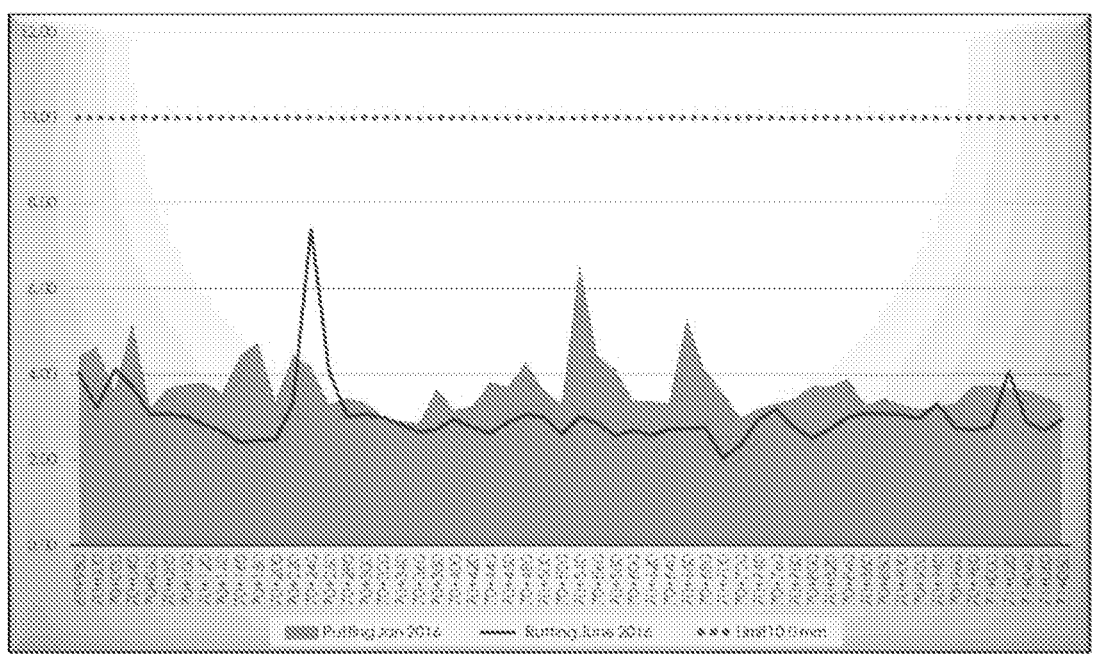
FIG. 11 is a graph showing the permanent deformation (rutting) of a road before and after application of the warm mix asphalt composition according to the present disclosure.

FIG. 11 shows rutting before (the measurement was made on the old asphalt layer in January) and after (the measurement was conducted immediately after the placement of the asphalt composition in June) the application of the warm mix asphalt composition of the invention. Comparing the results, it can be seen that rutting slightly decreased while gaining more uniformity.

The invention claimed is:

1. A warm mix asphalt additive, comprising:
   (a) a fatty amide wax obtained from reaction between a fatty acid and ethylenediamine;
   (b) a C16-C18 alkyl phosphoric ester; and
   (c) a fatty amine.

2. A warm mix asphalt additive kit comprising the warm mix asphalt additive according to claim 1, wherein each one of components (a), (b) and (c) is contained in a separate container.

3. The warm mix asphalt additive according to claim 1, wherein component (c) is selected from the group consisting of primary amines, dialkyl tertiary amines, polyamines, cyanoamines and mixtures thereof.

4. A warm nix asphalt additive kit comprising the warm mix asphalt additive according to claim 1, wherein two of components (a), (b) and (c) are mixed together and contained in one container.

5. The warm mix asphalt additive according to claim 1, wherein the fatty acid contains from 16 to 18 carbon atoms.

6. A warm mix asphalt binder composition comprising asphalt and the warm mix asphalt additive according to claim 1.

7. The warm mix asphalt binder composition according to claim 6, wherein component (a) is present in a range of 0.5 to 10.0% by weight based on total weight of the asphalt in the binder composition.

8. The warm mix asphalt binder composition according to claim 6, wherein component (b) is present in a range of 0.1 to 2.0% by weight based on total weight of the asphalt in the binder composition.

9. The warm mix asphalt binder composition according to claim 6, wherein component (c) is present in a range of 0.3 to 15.0% by weight based on total weight of the asphalt in the binder composition.

10. A warm mix asphalt composition comprising the warm mix asphalt binder composition according to claim 4 and aggregate.

11. The warm mix asphalt composition according to claim 10, wherein the aggregate is a fine aggregate of gradation type II, type III, or both type II and type III, according to the IS SA A-143 standard.

12. The warm mix asphalt composition according to claim 10, wherein the aggregate is a reclaimed asphalt pavement aggregate.

13. A method for preparing the warm mix asphalt binder composition according to claim 6 comprising the steps of:
   1) heating asphalt at a temperature in a range of 150 to 160° C.;
   2) adding component (a);
   3) Maintaining the temperature in the range of 150 to 160° C. and adding component (c); and
   4) adding component (b).

14. A method for preparing a warm mix asphalt composition as defined in claim 10, comprising mixing a warm mix asphalt binder composition comprising asphalt and an asphalt additive, comprising:
   (a) a fatty amide wax;
   (b) a C16-C18 alkyl phosphoric ester; and
   (c) a fatty amine,
   with aggregate at a temperature in a range of 130 to 150° C.

15. A method of surface treatment paving, said method comprising the steps of:
   A. preparing a warm mix asphalt binder composition comprising:

i) asphalt; and
ii) a warm mix asphalt additive comprising:
   (a) a fatty amide wax;
   (b) a C16-C18 alkyl phosphoric ester; and
   (c) a fatty amine,
B. combining the warm mix asphalt binder composition as defined in A with aggregate at a temperature in a range of 130 to 150° C. to form a warm mix asphalt composition;
C. applying the warm mix asphalt composition as defined in B on a surface course or base course of a pavement, wherein a temperature of the warm mix asphalt composition is in a range of 110 to 140° C.; and
D. compacting the warm mix asphalt composition, wherein a temperature of the warm mix asphalt composition is in a range of 90 to 120° C.

16. The method according to claim 15, wherein after step C, the warm mix asphalt composition has a thickness in a range of 0.8 to 1.2 cm.

* * * * *

UNITED STATES PATENT AND TRADEMARK OFFICE
CERTIFICATE OF CORRECTION

PATENT NO. : 11,939,271 B2
APPLICATION NO. : 16/604512
DATED : March 26, 2024
INVENTOR(S) : Álvaro Gutiérrez Muñiz et al.

Page 1 of 1

It is certified that error appears in the above-identified patent and that said Letters Patent is hereby corrected as shown below:

In the Claims

Column 22, Claim 4, Line 15:
"A warm nix asphalt" should read: --A warm mix asphalt--.

Column 22, Claim 11, Line 43:
"the IS SA A-143" should read: --the ISSA A-143--.

Column 22, Claim 13, Line 53:
"Maintaining the" should read: --maintaining the--.

Signed and Sealed this
First Day of July, 2025

Coke Morgan Stewart
*Acting Director of the United States Patent and Trademark Office*